(12) United States Patent
Sudo

(10) Patent No.: US 8,337,042 B2
(45) Date of Patent: Dec. 25, 2012

(54) LIQUID CRYSTAL MODULE

(75) Inventor: Tatsuji Sudo, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 22 days.

(21) Appl. No.: 12/814,778

(22) Filed: Jun. 14, 2010

(65) Prior Publication Data

US 2010/0321925 A1    Dec. 23, 2010

(30) Foreign Application Priority Data

Jun. 19, 2009   (JP) ................ P2009-146755

(51) Int. Cl.
*F21V 19/00* (2006.01)
(52) U.S. Cl. .............. 362/219; 362/97.2; 362/614
(58) Field of Classification Search ........... 362/97.2, 362/225, 97.4, 611, 614, 97.1–97.3, 217.01, 362/219, 221, 238
See application file for complete search history.

(56) References Cited

U.S. PATENT DOCUMENTS

| | | | | |
|---|---|---|---|---|
| 7,057,678 B2 * | 6/2006 | Ishida et al. | ............. | 349/58 |
| 7,165,862 B2 * | 1/2007 | Wu | ............. | 362/218 |
| 7,452,102 B2 * | 11/2008 | Ryu | ............. | 362/225 |
| 7,625,112 B2 * | 12/2009 | Ko et al. | ............. | 362/633 |
| 7,714,955 B2 * | 5/2010 | Tsubokura et al. | ............. | 349/61 |
| 7,722,242 B2 * | 5/2010 | Chen et al. | ............. | 362/634 |
| 7,837,377 B2 * | 11/2010 | Lee et al. | ............. | 362/633 |
| 7,959,318 B2 * | 6/2011 | Cho et al. | ............. | 362/217.15 |
| 2004/0008512 A1 | 1/2004 | Kim | | |
| 2005/0057946 A1 | 3/2005 | Kim | | |
| 2005/0068835 A1 * | 3/2005 | Matsuo | ............. | 365/222 |
| 2005/0276074 A1 | 12/2005 | Ryu | | |
| 2007/0030663 A1 | 2/2007 | Ryu | | |
| 2008/0055916 A1 | 3/2008 | Chen et al. | | |
| 2008/0079865 A1 * | 4/2008 | Kang et al. | ............. | 349/61 |
| 2008/0139008 A1 | 6/2008 | Lee et al. | | |
| 2008/0225198 A1 | 9/2008 | Azuma et al. | | |
| 2009/0154140 A1 * | 6/2009 | Aoki et al. | ............. | 362/97.2 |

FOREIGN PATENT DOCUMENTS

JP   2007-080627   3/2007
JP   2008-146050   6/2008

OTHER PUBLICATIONS

European Search Report issued Sep. 20, 2011.

* cited by examiner

*Primary Examiner* — Jong-Suk (James) Lee
*Assistant Examiner* — Leah S Macchiarolo
(74) *Attorney, Agent, or Firm* — Morgan, Lewis & Bockius LLP

(57) ABSTRACT

A liquid crystal module includes a lamp socket and a lamp frame. The lamp socket has a holding part holding a cold cathode tube which is inserted into the holding part through a slit. The slit is formed on a part of a face of the lamp socket. The lamp frame fixes the lamp socket to a rear frame so as to cover the lamp socket. A supporting part is formed on a face of the lamp frame and contacts the face of the lamp socket. A part of the face of the lamp frame opposing the part of the face of the lamp socket where the slit is formed is cut out.

3 Claims, 5 Drawing Sheets

LIQUID CRYSTAL MODULE

BACKGROUND

The present invention relates to a liquid crystal module of a direct below installed light type that is incorporated in a liquid crystal television or a personal computer, and more particularly to a liquid crystal module that can reduce the influence of heat generation from an end part having a pin terminal of a cold cathode tube by improving a fixing structure of a lamp frame for a lamp socket.

As the liquid crystal module of the direct below installed light type that is incorporated in a large liquid crystal television, a liquid crystal module is known in which a plurality of sets of straight cold cathode tubes, the one set of which includes the two cold cathode tubes, are arranged in a rear frame, lamp sockets are provided in both sides of the two cold cathode tubes of each set, and pin terminals at one ends of the cold cathode tubes of each set are connected together by a connecting plate to obtain a U shaped cold cathode tube. In such a liquid crystal module, as shown in FIG. 5, the end parts of the two cold cathode tubes 3 and 3 as one set having the pin terminals are inserted into hollow holding parts 4a and 4a at both end parts of the lamp socket 4 from slit parts 4b and 4b and held, and protrusions 4d and 4d in a lower face of the lamp socket 4 are inserted into holes formed on a bottom plate 1a of a rear frame 1 to attach the lamp socket 4 along a side plate of the rear frame 1. Then, a lamp frame 5 for covering the lamp socket 4 is installed inside the side plate of the rear frame 1 to press and fix an upper face of the lamp socket 4 by a socket pressing part 5d formed in a rear plate part 5c of the lamp frame 5.

On the other hand, as a related art concerning the attachment of the lamp socket of the liquid crystal module, for instance, a technique is known in which a lamp socket is soldered and fixed to a balance PCB in a supporter corresponding to the above-described lamp frame (Patent Document 1). As another related art, a technique is known in which a lamp socket is detachably connected to a connector on the face of a base board in a sub-frame corresponding to the above-described lamp frame (Patent Document 2).

[Patent Document 1] Japanese Patent Publication Number 2008-146050
[Patent Document 2] Japanese Patent Publication Number 2007-080627

However, as in the related liquid crystal module shown in FIG. 5, when the upper face of the lamp socket 4 is pressed and fixed by the socket pressing part 5d formed in the rear plate part 5c of the lamp frame 5, since both end parts of the lamp socket 4 in which the hollow holding parts 4a and the slit parts 4b are provided are heated by heat generated from both the ends of the cold cathode tubes 3 and 3 having the pin terminals so that the socket pressing part 5d of the lamp frame 5, especially, the temperature of parts pressing both the end parts of the lamp socket 4 is high, a countermeasure is taken that the lamp frame 5 molded by a synthetic resin having high heat resisting temperature is used or a current value of the cold cathode tube 3 is lowered to be used. However, a problem arises that the lamp frame made of the heat resisting synthetic resin causes a cost to be increased. Further, when the current value of the cold cathode tube is lowered to be used, since the number of the cold cathode tubes 3 needs to be increased so as not to lower a luminance, a problem also arises that the cost is increased.

On the other hand, since the techniques for fixing the lamp socket disclosed in the Patent Documents 1 and 1 are essentially different from the technique for fixing the lamp socket of the related liquid crystal module shown in FIG. 5. Accordingly, it is impossible that the techniques of the Patent Documents 1 and 2 may be applied to the related liquid crystal module as means for solving the above-described problems.

SUMMARY

It is therefore one advantageous aspect of the present invention to provide a liquid crystal module that can reduce an influence of heat generation from an end part of a cold cathode tube having a pin terminal to lower a cost and prevents the end part of the cold cathode tube from being put out from a lamp socket.

According to one aspect of the invention, there is provided a liquid crystal module, including:
a lamp socket having a holding part holding a cold cathode tube which is inserted into the holding part through a silt formed on a part of a face of the lamp socket;
a lamp frame fixing the lamp socket to a rear frame so as to cover the lamp socket;
a supporting part formed on a face of the lamp frame and contacting the face of the lamp socket;
wherein a part of the face of the lamp frame opposing the part of the face of the lamp socket where the slit is formed is cut out.

The liquid crystal module may further comprise a rib formed on the face of the lamp frame and opposing a side face of the lamp socket and a position where the slit is formed, so as to suppress an expansion of the slit.

The liquid crystal module may be configured such that the rib has a tapered shape.

DETAILED DESCRIPTION OF EXEMPLIFIED EMBODIMENTS

Figure 1:
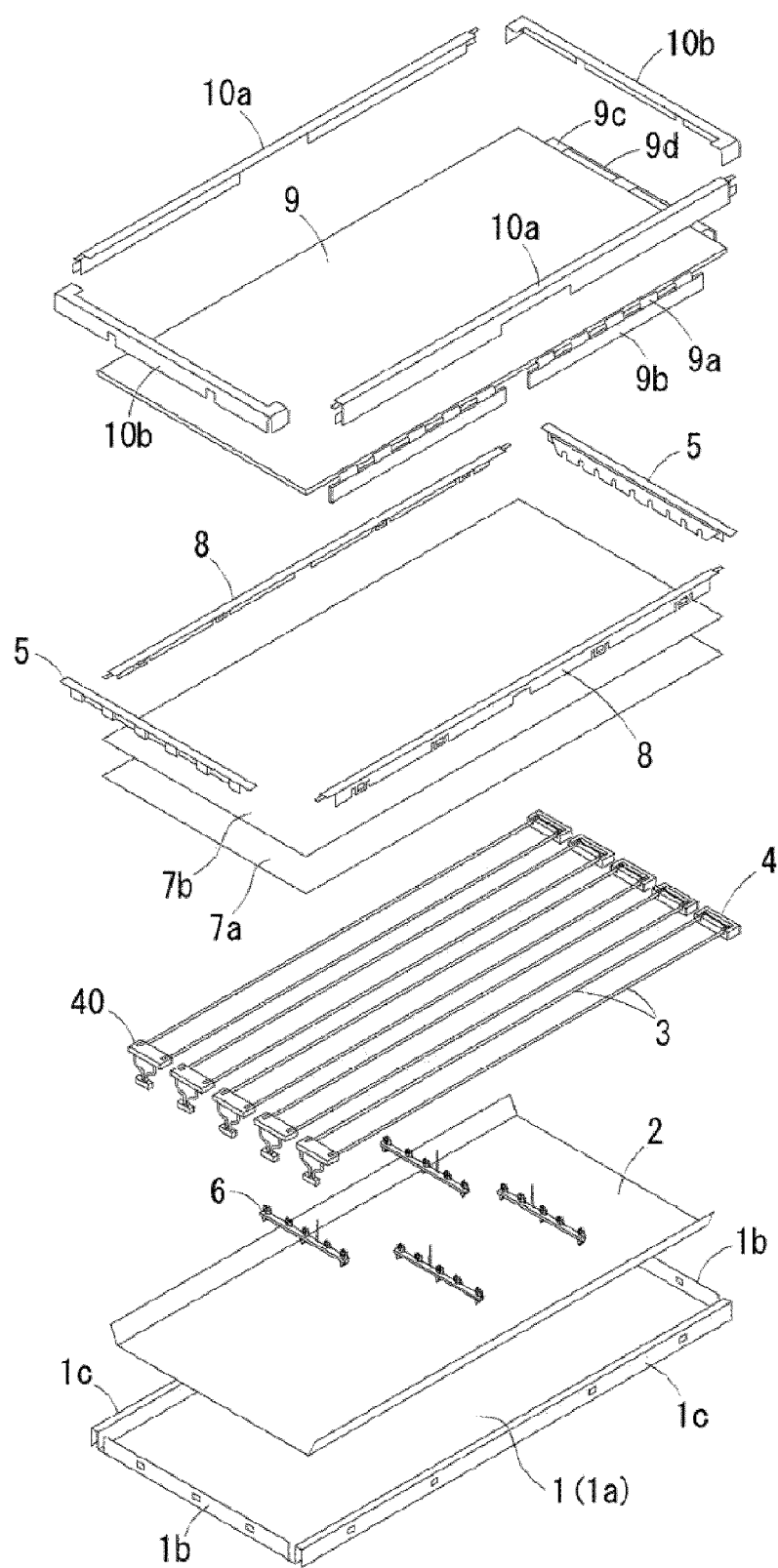
FIG. 1 is a perspective view of a liquid crystal module according to an embodiment of the present invention.

Exemplified embodiments of the invention are described below in detail with reference to the accompanying drawings.

A liquid crystal module of an exemplary embodiment shown in FIGS. 1 to 4 is assembled by main component parts including a rear frame 1, a light reflecting sheet 2, cold cathode tubes 3, lamp sockets 4 and 40, lamp frames 5, lamp holders 6, optical sheets 7a and 7b, cell guides 8, a liquid crystal panel 9 and vessels 10a and 10b.

The rear frame 1 is a shallow box shaped frame made of a plate and the light reflecting sheet 2 bent in an inverted trapezoid form is provided therein. On the light reflecting sheet 2, the straight cold cathode tubes 3 with one sets respectively composed of two cold cathode tubes are arranged in parallel. To both the sides of the cold cathode tubes 3 of each set, the lamp sockets 4 and 40 are attached. The intermediate parts of the cold cathode tubes 3 are held by the lamp holders 6 and fixed to a bottom plate 1*a* of the rear frame 1. Further, both the end parts of the cold cathode tubes 3 to which the lamp sockets 4 and 40 are attached are covered with the lamp frames 5 and 5 made of a synthetic resin which are provided inside side plates 1*b* and 1*b* at the right and left of the rear frame 1 so as not to generate unevenness in brightness caused from the lamp sockets.

The cold cathode tubes 3, the lamp sockets 4 and 40 and the lamp frame 5 will be described below in detail.

Figure 2:
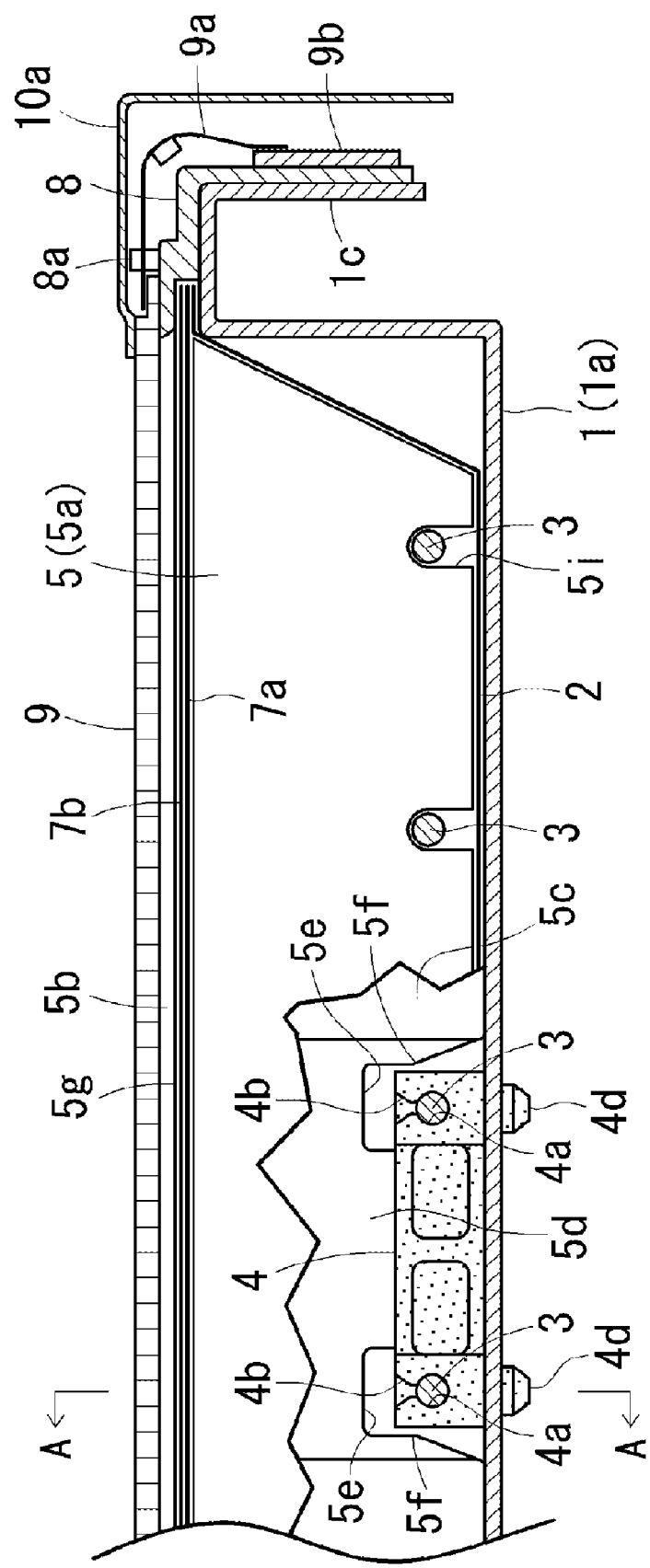
FIG. 2 is a cross-sectional view of a lamp frame of the liquid crystal module shown in FIG. 1.
Figure 3:
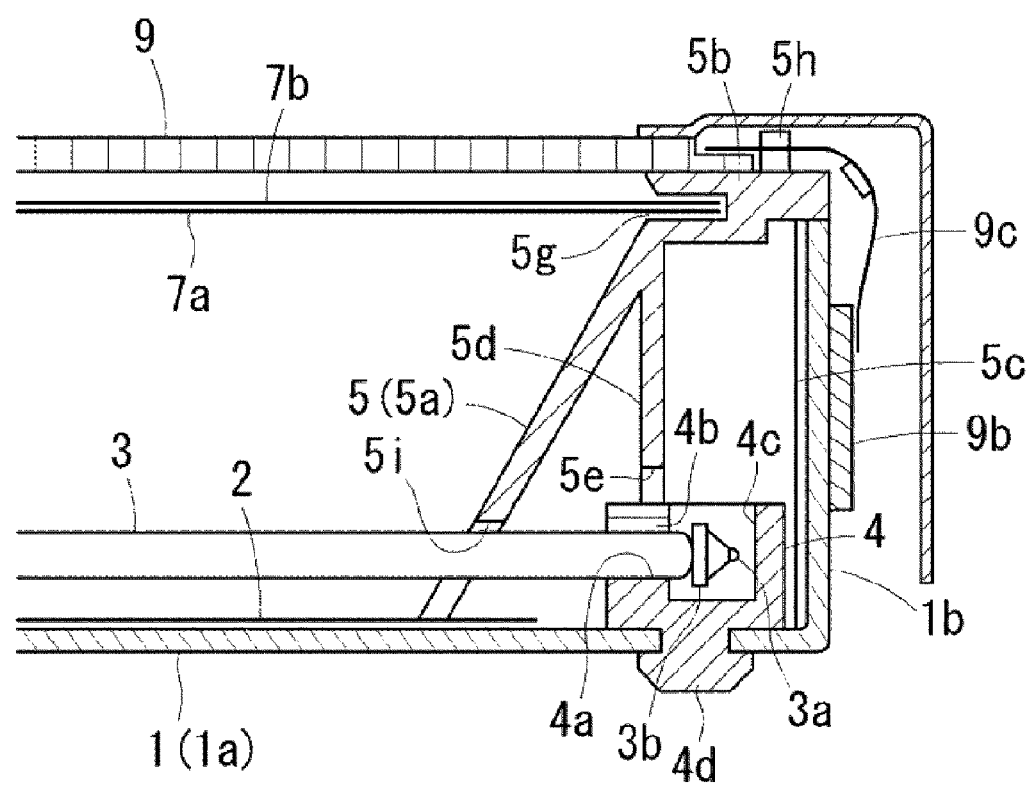
FIG. 3 is a sectional view taken along a line A-A in FIG. 2.

As shown in FIGS. 1 and 2, upper and lower side plates 1*c* and 1*c* of the rear frame 1 are bent in inverted U shapes to have double side plates. On upper faces of the double side plates 1*c* and 1*c*, end edges (upper and lower end edges along long sides) of the two optical sheets 7*a* and 7*b* are mounted and pressed by the cell guides 8 and 8. Then, right and left end edges of the optical sheets 7*a* and 7*b* are inserted into sheet receiving grooves 5*g* of the lamp frames 5, as shown in FIG. 3. The optical sheets 7*a* and 7*b* are light diffusion sheets that diffuse direct lights from the cold cathode tubes 3 or reflected lights reflected on the light reflecting sheet 2 to uniformly illuminate the liquid crystal panel 9 from the back. The upper optical sheet 7*b* is a thin light diffusion sheet. A thick light diffusion sheet, which may be a light diffusion plate, is used that is hardly flexible, as the lower optical sheet 7*a*.

On the lamp frames 5 and 5 and the cell guides 8 and 8, four peripheral edges of the liquid crystal panel 9 are mounted. As shown in FIGS. 2 and 3, the liquid crystal panel 9 is positioned by positioning protrusions 5*h* and 8*a* respectively formed on the upper faces of the lamp frames 5 and the cell guides 8 so as not to move upward and downward, and rightward and leftward. As shown in FIGS. 1 to 3, to end edges along long sides of the liquid crystal panel 9, X-wiring boards (X-PCB) 9*b* are connected through chip-on-films 9*a*, and to end edges along short sides of the liquid crystal panel 9, Y-wiring boards (Y-PCB) 9*d* are connected through chip-on-films 9*c* respectively. The X-wiring boards 9*b* are attached to side faces of the cell guides 8 and the Y-wiring boards 9*d* are attached to the side plates 1*b* of the rear frame 1 respectively.

The four peripheral edges of the liquid crystal panel 9 and the four side plates 1*b* and 1*b*, and 1*c* and 1*c* of the rear frame 1 are surrounded and covered with four long and short vessels 10*a*, 10*a*, 10*b* and 10*b* assembled in a rectangular frame form. The vessels are fixed to the double side plates 1*c* and 1*c* by screws.

Figure 4A:
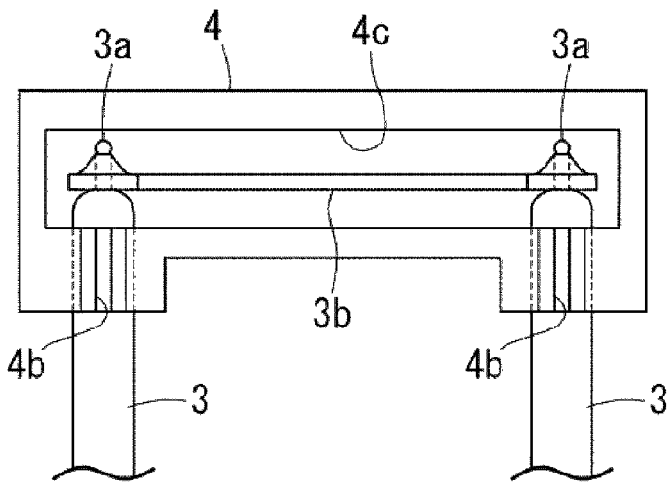
FIG. 4A is a plan view showing one end parts of a set of cold cathode tubes of the liquid crystal module shown in FIG. 1.

FIG. 4A shows one end parts of a set of cold cathode tubes having pin terminals connected to each other by a connecting plate, to which a lamp socket is attached.

Figure 4B:
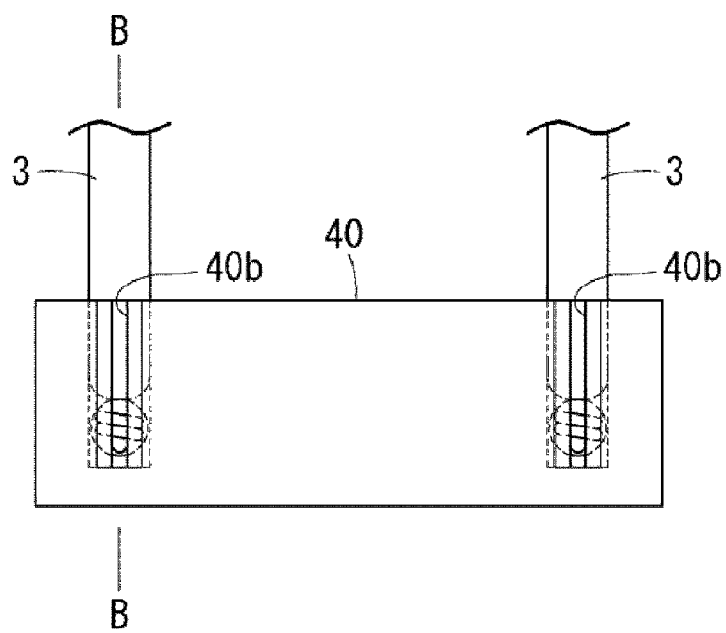
FIG. 4B is a plan view showing the other end parts of the set of cold cathode tubes of the liquid crystal module shown in FIG. 1.

FIG. 4B shows the other end parts of the set of cold cathode tubes to which a lamp socket is attached.

Figure 4C:
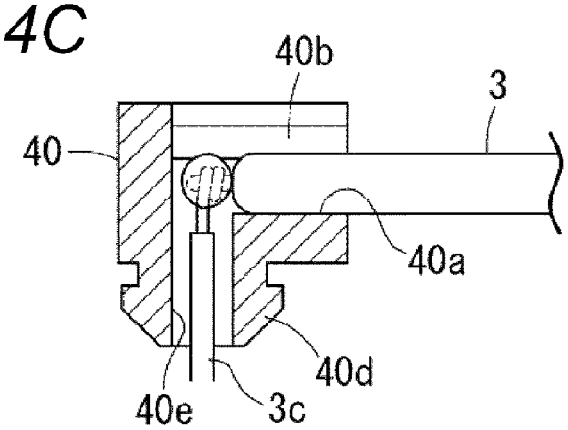
FIG. 4C is a sectional view taken along a line B-B in FIG. 4B.
Figure 5:
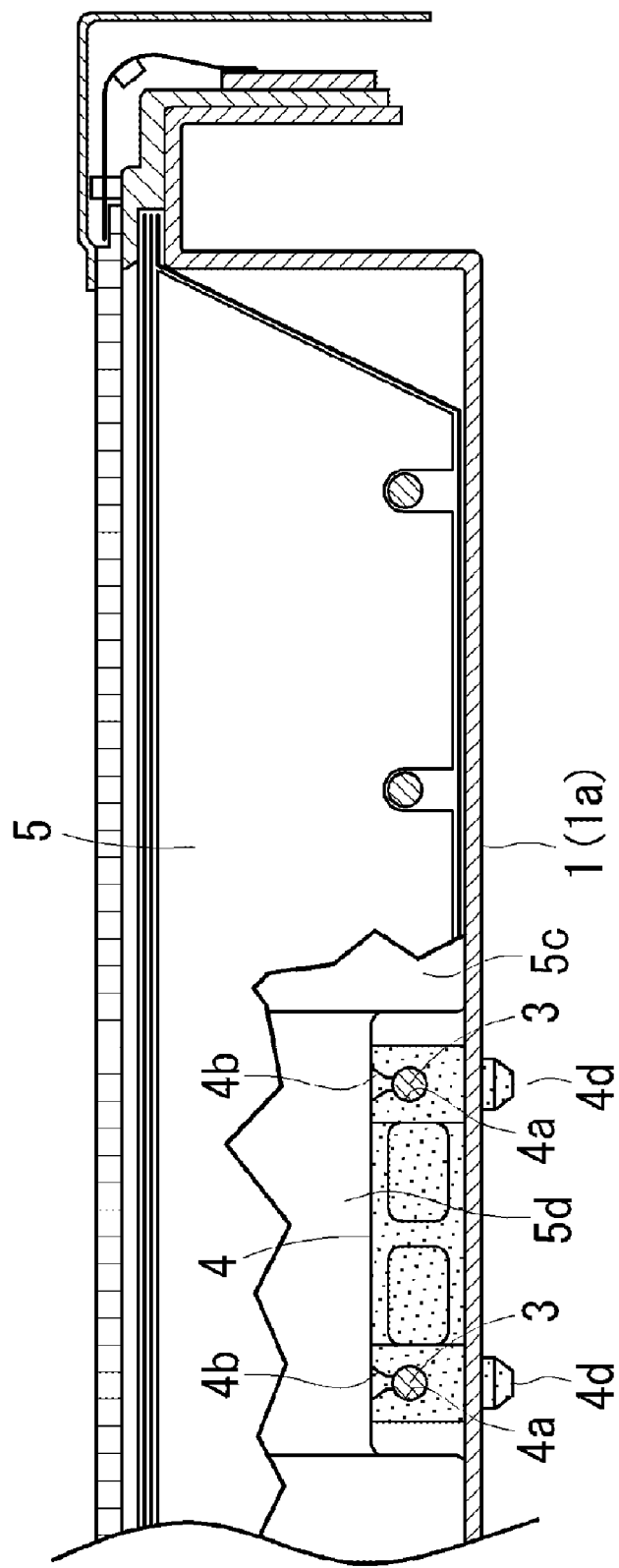
FIG. 5 is a cross-sectional view of a lamp frame of a related liquid crystal module.

Both the lamp sockets 4 and 40 are formed with heat resisting rubber. As shown in FIG. 4A, the one lamp socket 4 is attached to the one end parts of the cold cathode tubes 3 and 3 formed in a pseudo U shape by connecting together pin terminals 3*a* and 3*a* protruding from the one end parts of the two cold cathode tubes 3 and 3 as one set by a connecting plate 3*b*. As shown in FIGS. 4B and 4C, the other lamp socket 40 is attached to the other ends parts of the pseudo U shaped cold cathode tubes 3 and 3. The other end parts have the pin terminals connected to lead wires 3*c*.

As shown in FIGS. 2, 3 and 4A, at both end parts of the one lamp socket 4, hollow holding parts 4*a* and 4*a* and slit parts 4*b* and 4*b* are formed. The one end parts of the pseudo U shaped cold cathode tubes 3 and 3 are inserted into the hollow holding parts 4*a* and 4*a* from the slit parts 4*b* and 4*b* and held therein. Further, in the lamp socket 4, a groove part 4*c* is formed. In the groove part 4*c*, the connecting plate 3*b* is accommodated for connecting together the pin terminals 3*a* and 3 at the one end parts of the cold cathode tubes 3 and 3. Further, on lower faces of both the end parts of the lamp socket 4, protrusions 4*d* and 4*d* are formed. The protrusions 4*d* and 4*d* are fitted to holes (not shown in the drawings) formed in the bottom face 1*a* of the rear frame 1 so that the lamp socket 4 is attached inside the side face 1*b* of the rear frame 1.

The slit part 4*b* of the lamp socket 4 is formed to have a width narrower than that of the hollow holding part 4*a* as shown in FIG. 2. When an impact force is not applied, the one end part of the cold cathode tube 3 is not simply put out from the hollow holding part 4*a*. Further, both side faces of an upper part of the slit part 4*b* are formed in inclined faces which are expanded upward. When the one end part of the cold cathode tube 3 is pushed in from an upper part, the slit part 4*b* is elastically expanded so that the cold cathode tube 3 may be easily inserted into the hollow holding part 4*a*.

As shown in FIGS. 4B and 4C, the other lamp socket 40 includes, at both end parts of the socket, hollow holding parts 40*a* for holding the other end parts of the cold cathode tubes 3 and 3, slit parts 40*b* for inserting the other end parts of the cold cathode tubes 3 and 3 into the hollow holding parts, lead wire leading out ports 40*e* for leading out the lead wires 3*c* connected to pin terminals and protrusions 40*d* on a lower face. The protrusions 40*d* are fitted to holes formed on the bottom face 1*a* of the rear frame 1 to attach the lamp socket 40 inside the opposite side face of the rear frame 1.

The lamp frames 5 and 5 that cover the lamp sockets 4 and 40 include, as shown in FIGS. 2 and 3, are frames each of which is made of a synthetic resin including an inclined plate part 5*a*, a top plate part 5*b* and a rear plate part 5. In a lower end of the inclined plate part 5*a*, a cut out part 5*i* for inserting the cold cathode tube 3 is formed. In an upper end of the inclined plate part 5*a*, the above-described sheet receiving groove 5*g* is formed for inserting the end edges of the optical sheets 7*a* and 7*b*. On an upper face of the top plate part 5*b*, the above-described positioning protrusion 5*h* is formed for positioning the liquid crystal panel 9.

The rear plate part 5*c* of the lamp frame 5 is formed in an irregular plate shape that a recessed part recessed inward the rear frame 1 and a protruding part protruding outward the rear frame 1 are alternately connected. As shown in FIGS. 2 and 3, the recessed part 5*d* recessed inward the rear frame 1 serves as a socket pressing part 5*d* (a supporting part) for pressing the socket 4 from an upper part to fix the socket. In a lower end part of the socket pressing part 5*d*, recessed cut out parts 5*e* and 5*e* are formed for avoiding the contact with the upper face of the lamp socket 4 in which the hollow holding parts 4*a* and the slit parts 4*b* of the lamp socket 4 are provided at both the end parts. In other words, a part of the rear plate part 5*c* opposing the part of the face of the lamp socket where the slit parts 4*b* are formed is cut out. Further, in the vicinity of the socket pressing part 5*d* of the rear plate part 5*c*, expansion suppressing ribs 5*f* and 5*f* for suppressing the expansion of the slit parts 4*b* of the lamp socket 4 are formed near side faces at both the end parts of the socket where the slit parts 4*b* of the lamp socket 4 are provided.

As described above, when the upper face of the lamp socket 4 is pressed and fixed by the socket pressing part 5*d* having the recessed cut out parts 5*e* formed, even if both the end parts of the lamp socket 4 provided with the hollow holding parts 4*a* and the slit parts 4*b* are heated to a high temperature by heat generated from the end parts of the cold cathode tubes 3 and 3, a thermal conduction to the socket pressing part 5*d* of the lamp frame 5 is prevented by the recessed cut out parts 5*e* and 5e. Thus, the rise of the temperature is suppressed in the parts of the socket pressing part 5d where the recessed cut out parts are formed, so that the temperature is not so much high. Accordingly, the lamp frame 5 made of the synthetic resin may be used that is inexpensive and low in its heat resisting temperature. Further, since the current value of the cold cathode tube 3 is increased so that the number of the cold cathode tubes 3 may be reduced, a cost can be reduced.

Then, when the expansion suppressing ribs 5f and 5f are formed near the side faces at both the end parts of the socket 4 where the slit parts 4b of the lamp socket 4 are provided, even if the impact force is exerted on the liquid crystal module so that the end parts of the cold cathode tubes 3 and 3 are apt to be put out from the hollow holding parts 4a and 4a of the lamp socket 4, the expansion of the slit parts 4b and 4b of the lamp socket 4 is suppressed by the expansion suppressing ribs 5f and 5f. Thus, the end parts of the cold cathode tubes 3 and 3 are assuredly prevented from being put out from the hollow holding parts 4a and 4a of the lamp socket 4.

The expansion suppressing ribs 5f and 5f have tapered shape. Hence, interference between the expansion suppressing ribs 5f and 5f and the lamp socket 4 when the lamp frame 5 is attached to the rear frame 1 as pressing the lamp socket 4 can be suppressed. Thus, an attaching operation of the lamp frame 5 can be performed more easily.

Since the other lamp socket 40 is also pressed and fixed by the socket pressing part 5d of the lamp frame 5 having the recessed cut out parts 5e and 5e formed, even if both the end parts of the lamp socket 40 are heated by heat generated from the end parts of the cold cathode tubes 3 and 3, the rise of the temperature is suppressed in the parts of the socket pressing part 5d where the recessed cut out parts are formed. Further, the impact force is applied to the liquid crystal module, the expansion of the slit parts 40b and 40b of the lamp socket 40 is suppressed by the expansion suppressing ribs 5f and 5f. Accordingly, the same operational effects as those described above are obtained.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

The disclosure of Japanese Patent Application No. 2009-146755 filed Jun. 19, 2009 including specification, drawings and claims is incorporated herein by reference in it is entirety.

What is claimed is:

1. A liquid crystal module, comprising:
   two cold cathode tubes;
   two pin terminals respectively attached to one ends of the cold cathode tubes;
   a connecting plate connecting the pin terminals to each other;
   a lamp socket holding the cold cathode tubes; and
   a lamp frame fixing the lamp socket to a rear frame so as to cover the lamp socket,
   wherein the lamp socket includes:
      two slits configured to respectively insert the cold cathode tubes therethrough;
      two hollow holding parts configured to respectively hold the one ends of the cold cathode tubes therein; and
      a groove part configured to accommodate the pin terminals and the connecting late therein so that the pin terminals and the connecting plate do not come in contact with the lamp socket,
   wherein the slits are formed on a part of a face of the lamp socket,
   wherein a supporting part is formed on a face of the lamp frame and contacting the face of the lamp socket, and
   wherein a part of the face of the lamp frame opposing the part of the face of the lamp socket where the slits are formed is cut out.

2. The liquid crystal module as set forth in claim 1, further comprising:
   a rib formed on the face of the lamp frame and opposing a side face of the lamp socket and a position where the slits are formed, so as to suppress expansion of the slits.

3. The liquid crystal module as set forth in claim 2, wherein the rib has a tapered shape.

* * * * *